Aug. 27, 1963  A. A. WOLF  3,102,231
WHITE NOISE FAULT DETECTION SYSTEM
Filed April 19, 1961

INVENTOR.
ALFRED A. WOLF
BY George J. Seligsohn
ATTORNEY

United States Patent Office 3,102,231
Patented Aug. 27, 1963

3,102,231
WHITE NOISE FAULT DETECTION SYSTEM
Alfred A. Wolf, Rochester, N.Y., assignor to General Dynamics Corporation, Rochester, N.Y., a corporation of Delaware
Filed Apr. 19, 1961, Ser. No. 104,097
4 Claims. (Cl. 324—57)

This invention relates to automatic fault detection testing equipment and, more particularly, to such a system utilizing white noise as a probe signal. In addition, it has uses in general probing of a class of systems for pattern recognition, automatic statistical measurement of noisy signals, investigation of transmission characteristics of systems whose internal configuration is not known and for medical diagnosis.

The growing complexity of military and industrial systems has created a need for techniques whereby faults in these systems may be automatically and rapidly disclosed and corrected. Presently the diagnosis of faults in a complex system requires a skilled technician utilizing a combination of routine tests, intuition based on experience, trial and error methods, and luck.

Presently, automatic fault detection and diagnosis are based on one of two possible approaches, or a combination thereof. In the first approach, a large number of special test signals are applied to the system under test, and the system response is compared with a large number of stored responses corresponding to proper operation and to various kinds of malfunctions. From the comparison, the system faults are detected and diagnosed, provided the responses due to all possible malfunctions have been stored.

In the second approach, point-by-point measurements are made of voltages, response, tube and transistor parameters, etc. These are then compared with the values specified for a properly functioning system, the discrepancies between the measured and desired values indicating the faulty units and components.

Severe limits inhere in each of these schemes. In the first approach, an inordinate amount of response data must be taken and stored for a system of even moderate size, and then the diagnosis may be ambiguous when combinations of faults occur. In the second approach, a large number of test points must be brought out of the system and a special test procedure must be devised and instrumented for each piece of equipment to be tested.

The present invention does away with the need to utilize a large number of test signals or the need to bring out a large number of test points from the system under test, by probing the system with a noise signal which approximates white noise over a wide frequency range. White noise statistically includes signals of all possible amplitudes, frequencies, and phases. By analyzing response of the system to the white noise input of the system statistically, information may be derived for uniquely determining all the actual individual parameters of the system under test.

The method of the present invention is applicable to a broad class of stable physical systems for which the mathematical model is known. Although the present invention is particularly useful with electrical systems, it may operate with mechanical, thermal, hydraulic, etc., systems by utilizing transducers to convert an electrical input into the form of energy of the system under test and to convert the output of the system into its electrical equivalent.

Briefly, the present invention consists in simultaneously exciting the system under test and also an array of linear orthogonal filters with substantially white noise, i.e., with wide-band Gaussian noise which extends over a frequency spectrum at least ten times as wide as the frequency response of the system under test. The output of the system under test is then statistically averaged with the output of each of the orthogonal filters by multiplication and smoothing. Wide-band Gaussian noise is employed because it contains almost all possible signals and, therefore, allows the scheme to be used for testing nonlinear, as well as linear, systems. Orthogonal filters are used to insure the statistical independence of the filter outputs. The result of the statistical averaging is a set of numbers, Wiener statistics (averages), that uniquely display the state of the system at the time they are measured. Each member of the set of Wiener statistics is linearly independent of all of the other members. Therefore, by providing a quantity of Wiener statistics numbers equal to the numbers of parameters in the system under test, a set of simultaneous equations may be set up and solved to determine the actual values of all the parameters. Alternatively, the measured set of Wiener statistics may be compared to the stored set of Wiener statistics that would have resulted from the same test of a properly functioning system.

It is, therefore, an object of the present invention to provide a fault detection scheme utilizing white noise system excitation.

This and other objects, features, and advantages of the present system will become apparent from the following detailed description taken together with the accompanying drawings, in which.

Figure 1:
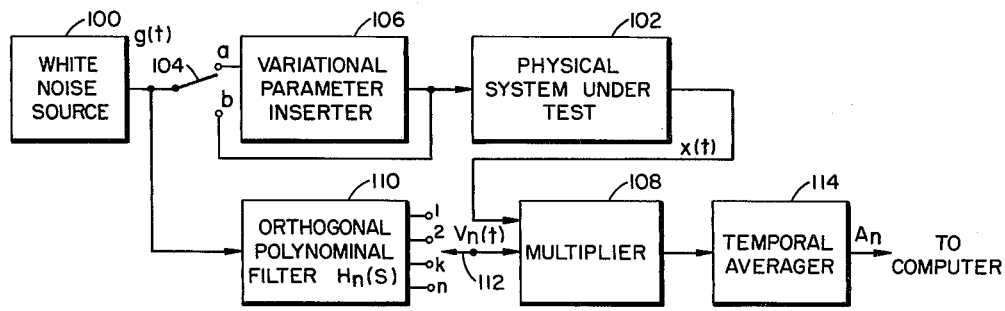
FIG. 1 is a block diagram of a preferred embodiment of the invention.

Referring now to FIG. 1, white noise source 100, which may be a shot-effect noise generator, applies its output either directly to physical system under test 102 through contact $b$ of switch 104 or through variational parameter inserter 106 to physical system under test 102 through contact $a$ of switch 104. The output from physical system under test 102 is applied as a first input to multiplier 108.

Figure 2:
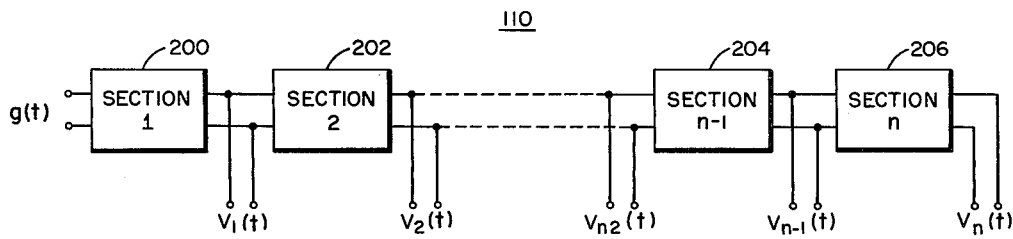
FIG. 2 is a block diagram of the polynomial orthogonal filter of FIG. 1.
Figure 3:
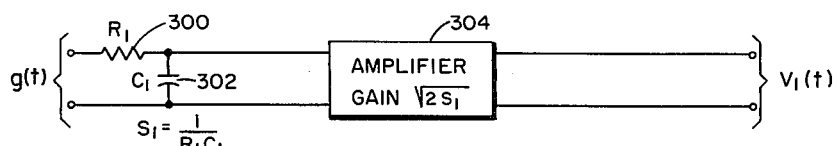
FIG. 3 is a block diagram of the first orthogonal filter section.
Figure 4:
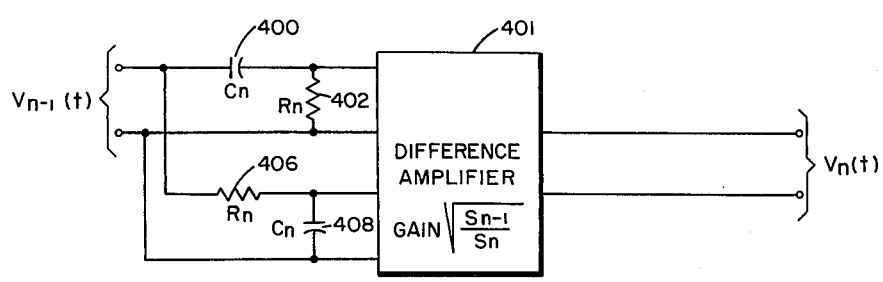
FIG. 4 is a block diagram of each of the other orthogonal filter sections.

The output of white noise source 100 is also applied as an input to linear orthogonal filter 110, which is shown in detail in FIGS. 2–4. The various outputs of orthogonal filter 110 may be selectively applied as a second input to multiplier 108 through switch 112. The output from multiplier 108 is applied as an input to temporal averager 114, which may be an integrating circuit, and the outputs from temporal averager 114, which consists of the Wiener statistics, are applied as an input to a computer (not shown).

Referring now to FIG. 2, orthogonal polynomial filter 110 consists of $n$ sections, such as sections 200, 202, 204, and 206, connected in series as shown. Respective outputs are taken from each of the various sections of the filter, as shown.

Referring now to FIGS. 3 and 4, one form the linear orthogonal filter may take is the so-called Kautz filter. The first section of the filter which is shown in FIG. 3 consists of a serially connected resistance 300 having a value $R_1$ and capacitance 302 having a value $C_1$ connected across the input from white noise source 100. The voltage across capacitance 302 is applied to amplifier 304 having a gain equal to $\sqrt{2S_1}$, where $S_1$ is equal to the corner frequency $$\frac{1}{R_1C_1}$$

In each of the other sections of the orthogonal polynomial filter 110, such as sections 202, 204 and 206, as shown in FIG. 4, the input to the filter is applied across series-connected capacitance 400, having a value $C_n$, in series with resistance 402 having a value $R_n$. The voltage across resistance 402 is applied as a first input to difference amplifier 404. The input to the filter is also applied across resistance 406, having a value $R_n$, in series with capacitance 408, having a value $C_n$. The voltage across capacitance 408 is applied as a second input to difference amplifier 404. Difference amplifier 404 has a gain equal to $$\sqrt{\frac{S_{n-1}}{S_n}}$$

where $S_n$ is equal to the corner frequency $$\frac{1}{R_n C_n}$$

and $S_{n-1}$ is equal to the corner frequency of the preceding section of the filter. The output from difference amplifier 404, which is equal to the difference between the first and second inputs thereof, is applied to the input of the next succeeding filter section.

The various corner frequencies of the several filter sections may be arbitrarily chosen. However, it has been found that choosing the corner frequency of each succeeding filter section to be double the corner frequency of the preceding filter section provides wide frequency band response. The corner frequency of the last filter should be high enough to provide a frequency response at least as high, and preferably higher, than the frequency response of the system under test.

Before discussing the operation of the system, it might be pointed out that the use of a linear orthogonal filter is the heart of the invention.

"Orthogonal" is a mathematical term meaning that the integral of the weighted product of two different functions of a sequence of functions is zero between specified limits of integration. In other words, the total positive area under the product of the two functions is the same as the total identical negative area, so that the net area under the product of the two functions is zero. If the integral is not zero, but some constant, the functions are not orthogonal, but are correlated, i.e., they contain common information related to a function of the magnitude of the constant.

In the orthogonal filter, the average value of the product of the outputs from any two sections will be zero when the filter is excited by Gaussian noise, i.e., the outputs are uncorrelated, or linearly independent. This means that the outputs from different sections of the orthogonal filter are statistically independent since uncorrelated Gaussian processes are statistically independent. Furthermore, since the transfer function of each filter section is predetermined, the statistically independent information contained in the output of each filter section is known.

Since the outputs of the various sections of the orthogonal filters are statistically independent, the correlation which exists between each of these filter section outputs and the output of the system under test will also be independent of each other. Thus, the use of the orthogonal filter insures that the information about the system under test's response obtained by correlating the output of the system under test with each of the outputs of the various filter sections will be independent.

Considering now the operation of the disclosed system, when the white noise from white noise source 100 is applied directly to the system under test through contact $b$ of switch 104, the system under test 102, in accordance with its transmission characteristics, will uniquely respond to the white noise input, to provide a random output the statistics of which include complex information as to the physical characteristics of the system under test 102, the mathematical model of which is known.

Multiplier 108 and temporal averager 114 together form a correlator for correlating the information contained in the output of the system under test with each of the statistically independent outputs of orthogonal polynomial filter 110.

In response to the application of the output of each filter section to multiplier 108, a direct voltage will be obtained from the output of temporal averager 114, the polarity and magnitude of which is an indication of the amount of correlation which exists between the output of the physical system under test and the output of that filter section. This gives a plurality of linearly independent quantities (Wiener statistics), one for each of the filter sections, characterizing the system under test.

In order to obtain enough coefficients to provide information from which the values of each of the parameters of the system under test may be computed, it is necessary to provide a number of Wiener statistics equal to the number of parameters. If the transmission characteristic of the system under test includes a number of coefficients equal to the number of parameters in the system under test, the proper number of Wiener statistics may be obtained by providing an orthogonal filter having a section corresponding to each coefficient. In this case, variational parameter inserter 106 may be omitted.

However, when the transmission characteristic of the system under test has too few coefficients to provide a number of Wiener statistics equal to the number of individual parameters of the system under test, it is necessary to change the transmission characteristic between the white noise source and the input to multiplier 108 in known manners in order to obtain an additional number of independent statistics equal to the discrepancy. This is accomplished by variational parameter inserter 106, which may be connected in series with the white noise source and the system under test when switch 104 is connected to a contact. By the use of variational parameter inserter 106, one or more parameters of known value—such as resistance, capacitance, or inductance in electrical networks—may be inserted between white noise source 100 and physical system under test 102. The variational parameter may also be inserted at the output of the system or within the system if necessary.

With variational parameter inserter 106 connected, the various outputs of orthogonal filter 110 are again correlated with the output of the physical system under test to give additional statistics $A_n$ from the output of temporal averager 114.

In this manner, it is possible to obtain a sufficient number of statistics $A_n$ to correspond on a 1:1 basis with the number of individual parameters in the system under test.

In accordance with the mathematical model of the system under test, the set of statistics $A_n$ may be used to set up a number of independent simultaneous equations equal in number to the number of parameter values to be computed, from which the actual values of the parameters of the system under test may be obtained. This is preferably done in a computer, which is programmed in accordance with the mathematical model of the system under test.

As an alternative, each of the statistics $A_n$ may be compared to a corresponding statistic previously computed or measured for a fault-free system, and a "go-no go" device operated if any of the measured values of $A_n$ differ from the "true" values by more than a given tolerance.

Although only a preferred embodiment of the invention has been disclosed herein, it is not intended that the invention be restricted thereto, but that it be limited only by the true spirit and scope of the appended claims.

What is claimed is:

1. Apparatus comprising a white noise source, correlating means for producing a voltage output therefrom having a magnitude and polarity manifesting the correlation which exists over a given period of time between first and second inputs applied thereto, transmission means including a system under test coupled between said white noise source and said correlating means for applying white noise from said source modified in accordance with the transmission characteristics of said system under test as a first input to said correlating means, an orthogonal polynomial filter coupled to said white noise source for producing a given plurality of separate statistically independent outputs, and means for successively applying each of said filter outputs as a second input to said correlating means for a given period of time.

2. The apparatus defined in claim 1, wherein said transmission means further includes means for inserting a parameter of known value between said white noise source and said correlating means to further modify the white noise applied as a first input to said correlating means.

3. Apparatus comprising a white noise source, correlating means for producing a voltage output therefrom having a magnitude and polarity manifesting the correlation which exists over a given period of time between first and second inputs applied thereto, transmission means including a system under test coupled between said white noise source and said correlating means for applying white noise from said source modified in accordance with the transmission characteristics of said system under test as a first input to said correlating means, an orthogonal polynomial filter coupled to said white noise source for producing a given plurality of separate statistically independent outputs, and means for applying one of said filter outputs as a second input to said correlating means for a given period of time.

4. The apparatus defined in claim 3, wherein said transmission means further includes means for inserting a parameter of known value between said white noise source and said correlating means to further modify the white noise applied as a first input to said correlating means.

References Cited in the file of this patent
UNITED STATES PATENTS

| | | |
|---|---|---|
| 2,891,217 | Grieg | June 16, 1959 |
| 2,988,693 | Billig et al. | June 13, 1961 |
| 3,038,119 | Billig et al. | June 5, 1962 |